United States Patent

[11] 3,570,761

[72] Inventor Richard W. Hatch, Jr.
Foxboro, Mass.

[21] Appl. No. 834,733
[22] Filed June 19, 1969
[45] Patented Mar. 16, 1971
[73] Assignee The Foxboro Company
Foxboro, Mass.

[54] PNEUMATIC ANALOG TO DIGITAL CONVERTER
4 Claims, 3 Drawing Figs.

[52] U.S. Cl. .......... 235/201
[51] Int. Cl. .......... G06d 3/00
[50] Field of Search .......... 235/200—201; 137/81.5, 85

[56] References Cited

UNITED STATES PATENTS 3,237,859 3/1966 Hatch .......... 235/201
3,373,935 3/1968 Thorburn .......... 137/85

*Primary Examiner*—Richard B. Wilkinson
*Assistant Examiner*—Lawrence R. Franklin
*Attorney*—Lawrence H. Poeton

ABSTRACT: A pneumatic analogue to digital transducer based on a matrix of fluidic resistance elements as bleeds to atmosphere from a supply manifold to these elements, with switches in these elements to individually selectively open or close such bleeds to atmosphere, an analogue input branched to the supply manifold on the one hand and to a digital system of operation of such switches on the other hand, this digital system comprising a series arrangement of a balanceable pressure differential device receiving the analogue input, an oscillator gate system used with the differential pressure device, and an up-down fluidic counter actuated by the oscillator gate system to selectively operate the resistance matrix switches in a digital representation of the analogue input.

INVENTOR.
RICHARD W. HATCH JR.
BY
Laurence H. Poston
AGENT

INVENTOR.
RICHARD W. HATCH Jr.
BY
Lawrence H. Poston
AGENT

PNEUMATIC ANALOG TO DIGITAL CONVERTER

This invention relates to converters, and has particular reference to pneumatic analogue to digital converters for use in process and/or energy instrumentation.

In modern uses of such instrumentation, the most effective systems need to combine the uses of the best means to accomplish best the functions of different portions of the instrumentation. For example, analogue means where it is most effective, and digital means where it is most effective. Such combinations may be the result of total planning of new systems, or may result as the best use of available equipment and systems.

Because of this situation, there is increasing need for improved interface systems, such as transducers, and for example, for analogue to digital converters.

The illustration of this invention, as presented herein, is in the form of a pneumatic system to which analogue signals may be applied, including a balanceable pressure differential device which operates a digital system of resistance bleed elements with feedback to the balanceable device. The digital action necessary to the rebalance action provides a digital output representative of the analogue input.

This invention lends itself to thin sandwich construction of a nature to allow systems in the direction of simplicity and miniaturization.

In the system of this invention, the analogue input is compared with a fixed pressure after passing through an input resistor. The deviation in pressure is used to drive a binary counter, either up or down depending upon the direction of the deviation. The output of the counter is used to open and close switches in the resistance matrix to vary its open connection to atmosphere. The matrix is also connected to the analogue input signal, and acts as a bleed therefrom. The input pressure, as affected by such bleed action, is balanced against the fixed reference or set point pressure. The output of the up-down counter is a digital representation of the amount of bleed, and accordingly, of the value of the analogue input signal.

The up-down counter system set forth herein is a development of the counter system of the Hatch U.S. Pat. No. 3,259,314, which discloses a binary counter stage with no moving parts, automatically responsive to a series of input signals to provide binary readout. This device provides a change in its fluid logic system, upon the application of an input pulse; this change being achieved by a rising signal, and being followed by an internal preparatory automatic action upon the falling of this same signal in preparation for the advent of the next signal.

Such input signals, in the system herein as illustrative of this invention, are supplied from a pulse source oscillator system, as used with the output of the pressure differential balance device in the system of this invention.

Other objects and advantages of this invention will be in part apparent and in part pointed out hereinafter and in the accompanying drawings, wherein.

Figure 1:
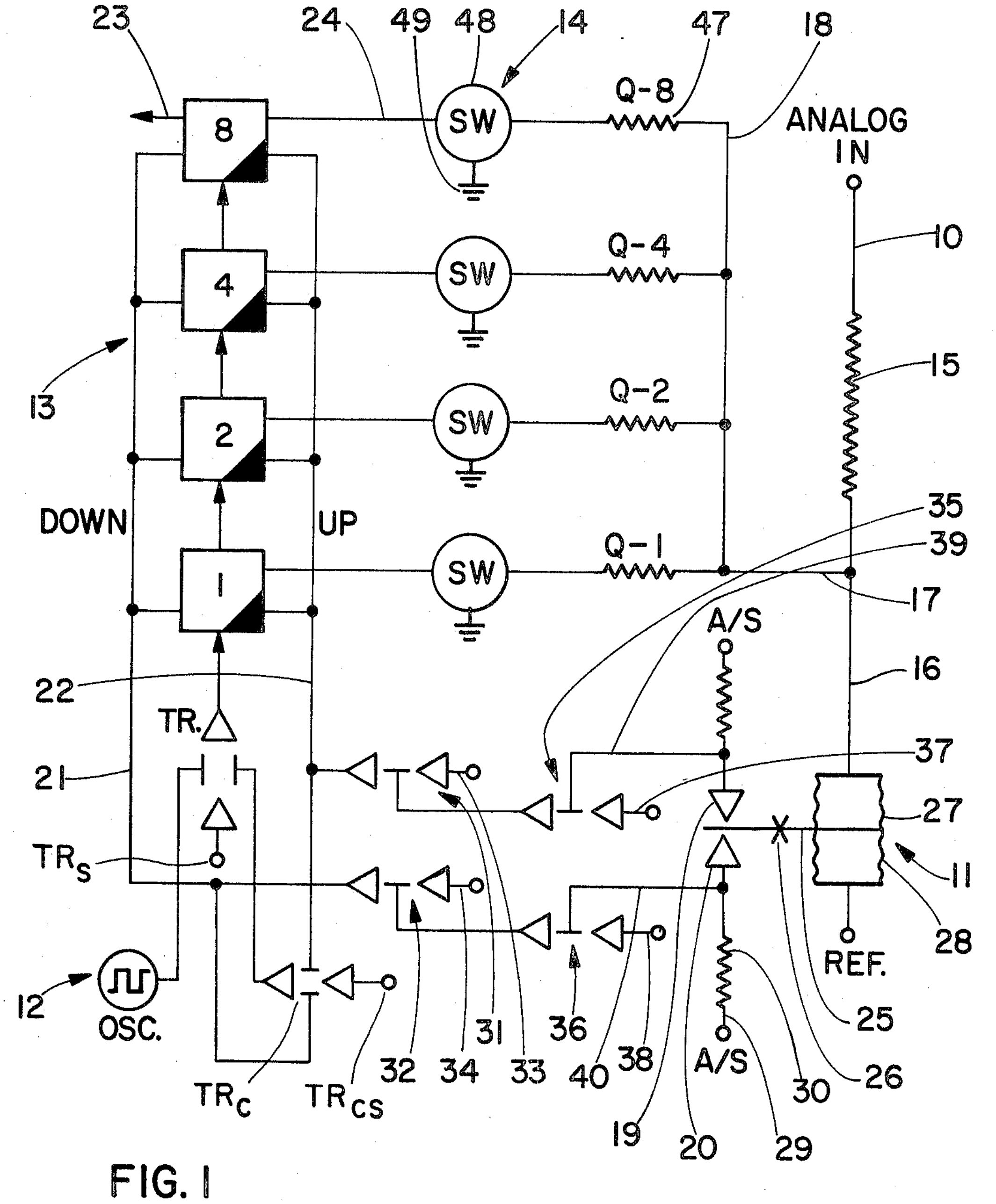
FIG. 1 is a schematic illustration of a converter system according to this invention.

The system of FIG. 1 comprises a pneumatic system in the form of a pressure balance control loop comprising an analogue signal input 10, a pressure balance device 11, an oscillator system 12, an up-down counter assembly 13, and a fluid resistance bleed-to-atmosphere matrix 14, with the output of the overall system in terms of the digital combination established by the condition of the various bits of the counter assembly 13.

In this FIG. 1 overall system an input fluid analogue signal is introduced by way of the input 10 and through an input resistance 15. The system branches, downstream of the resistance 15, into a passage 16 to the pressure balance device and into a passage 17 to a supply manifold 18 in the resistance matrix 14.

The output of the pressure balance device 11 is accomplished through back pressure initiated by closing of one or the other of opposed nozzles 19 and 20. The output of the pressure balance device 11 is directed to operate one or the other of output passages 21 and 22, depending on the direction of the input control signal from the pressure balance device 11. Passage 22 is the UP signal passage, and passage 21 is the DOWN signal passage, as inputs to the up-down counter assembly 13. The up and down signals are applied individually to each counter logic bit, and each bit is provided with readout as at 23, and with operating output as at 24 as applied individually to its related elements in the resistance matrix 14.

The input resistor 15 is provided as a summing function with respect to the various bleeds of the resistance matrix 14.

The differential pressure balance device 11 comprises a tilt member 25 operable about a pivot 26. The input analogue signal is applied to the tilt member 25 by means of a bellows 27, in opposition to a zero set reference pressure in a bellows 28. The nozzles 19 and 20 oppose each other with respect to the tilt member 25, and on the opposite side of the pivot 26 with respect to the bellows 27 and 28. Each nozzle is supplied from a fluid source and through a nozzle restrictor, as illustrated at 29 and 30 with respect to nozzle 20.

The oscillator system 12 and the output system of the unit 11 are made up of fluid logic diffusion gates wherein from a supply of air a laminar stream is directed to an output in free flow across an empty space when uninterrupted, to provide a logic output one, and when interrupted by a transversely applied control signal jet, whose impingement results in diffusion of the free-flowing laminar stream, to provide a logic output zero.

In the output of the unit 11, there are two such gates 31 and 32 as the main operational stream gates, supplied respectively from air sources 33 and 34. Control signals are individually supplied to the gates 31 and 32 from associate gates 35 and 36 as supplied from air sources 37 and 38, and as individually controlled by back pressure inputs 39 and 40 respectively from the systems of the nozzles 19 and 20 in the pressure balance device 11.

The oscillator 12 operates to periodically open a trigger gate TR (see also Trigger Input, FIG. 2) to the counter. The gate TR is thus periodically receptive to a trigger input signal from a trigger source TR*s*.

Accordingly, the counter 13 operates in response to an up or down signal when the gate TR is open.

When the system is balanced, and there is no up or down signal to the counter, the oscillator is shorted out by closing action on the trigger gate TR from a signal source TR*cs* through a trigger control gate TR*c*.

Gate TR*c* is closed by control inputs from the up or down lines 22 or 21 when there is a signal in either of these lines.

Thus the counter is shielded from possible noise in the system when there are no up or down signals, in that the trigger gate TR is closed at such times by a signal from source TR*cs* through control gate TR*c*.

The up-down counter assembly 13 is made up of a logic series of bits to any desired number. Shown in FIG. 1 are 4 bits, in logic progression of 1, 2, 4, and 8, as indicated.

Figure 2:
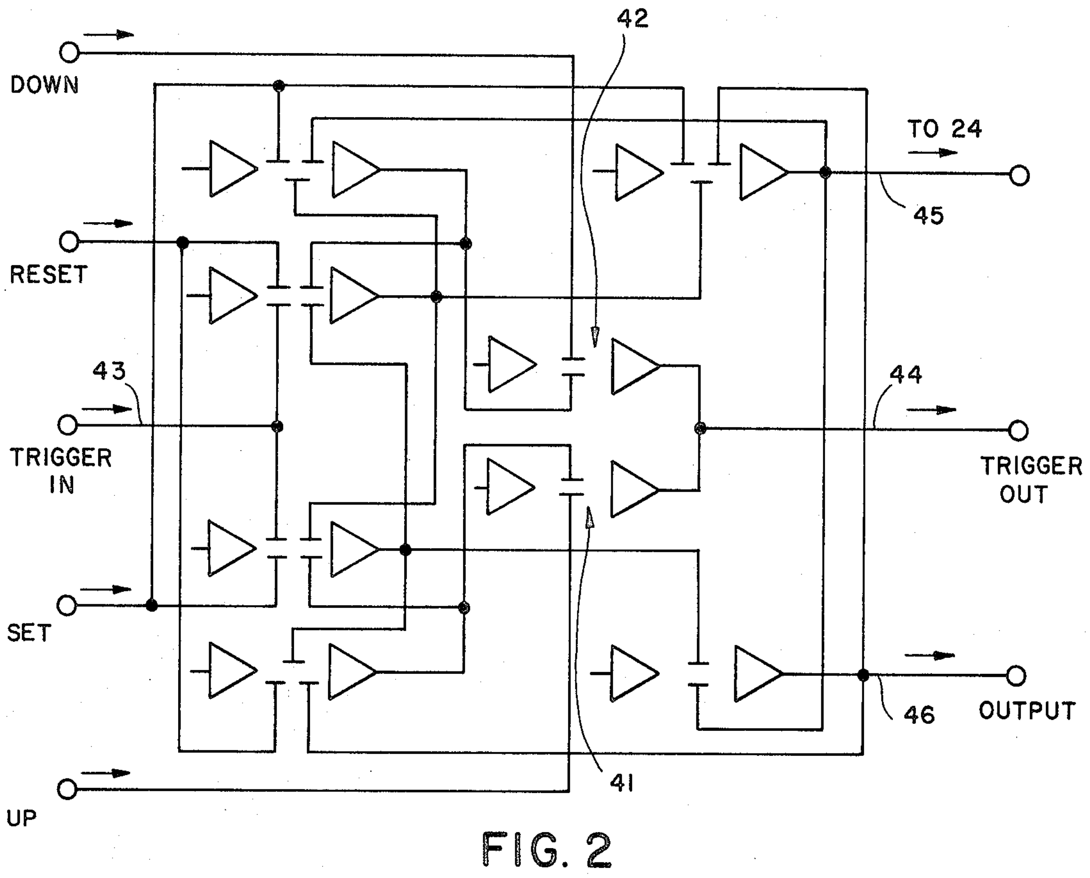
FIG. 2 is a schematic illustration of a fluidic up-down counter as an example of a counter suitable to the system of this invention.

The fluid logic diffusion unit system of each of the counter bits is illustrated by the single bit showing of FIG. 2. This system is essentially the same as that disclosed in the U.S. Pat. to Hatch No. 3,259,314 previously mentioned herein, with up and down gate additions as indicated at 41 and 42.

The system of FIG. 2 has a trigger supply input 43 as also shown in the above patent, and has set and reset inputs as shown. The up and down inputs of each such bits are directly from the up and down lines 22 and 21 of the FIG. 1 system. The FIG. 2 trigger output 44 is also the input to the next bit in the counter assembly. The two outputs 45 and 46 of the FIG. 2 bit each alternate in output value as logic one and logic zero with successive input pulses to the bit. Either output 45 or 46 may be used as the FIG. 1 control 24 to each of the resistance bleed systems of the matrix 14 and, by branching (not shown) also as the readout of the bit. Or, if desired, one of the outputs 45, 46 may be used as a control, and the other the readout, with suitable cognizance of the logic inversion of this last arrangement.

Figure 3:
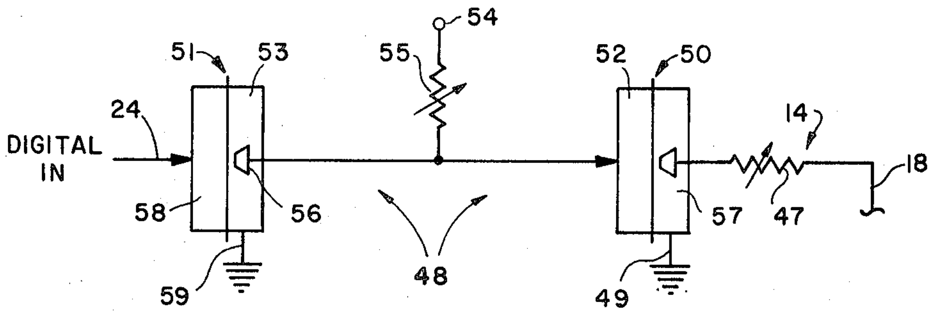
FIG. 3 is a schematic illustration of a representative digital control element system as the output of one counter bit as applied to one of the resistance matrix elements.

As in FIG. 1 and 3, each of the resistance bleed elements of the matrix 14 comprises a resistance 47 and a fluid switch 48 between the matrix supply manifold 18 and atmosphere as at 49.

FIG. 3 illustrates one form of a fluid switch fluid system suitable for use as the switch 48. The resistance matrix manifold is at the right, 18, of FIG. 3, and the control input signal from the related bit, FIG. 2, of the counter assembly of FIG. 1, is at the left of FIG. 3.

The switch system of FIG. 3 comprises a pair of diaphragmed capsules 50 and 51 with inner chambers 52 and 53 respectively, both of these chambers being supplied with air from a single source 54 through a restrictor 55. This input to chamber 53 is shown by way of a nozzle 56.

The diaphragmed capsules 50 and 51 have outer chambers 57 and 58. In capsule 50, the outer chamber 57 is part of the passage from the manifold 18 to atmosphere at 49. In capsule 51, the inner chamber 53 has an outlet 59 to atmosphere, and the outer chamber 58 receives the digital input logic zero or logic one through the input passage 24.

Accordingly, as in FIG. 3, when the input through 24 is zero, the nozzle 56 is uncovered, and the air supply 54 is bled to atmosphere through chamber 53. As a result, pressure in the chamber 52, of the diaphragm capsule 50, is effectively zero and chamber 57 is open to allow air bleed from the manifold 18 to atmosphere at 49.

Again, in FIG. 3, when the input through 24 is one the nozzle 56 is closed by the diaphragm of capsule 51, with the result that pressure builds up in the inner chamber 52 of diaphragm capsule 50. In consequence, the input to chamber 57 from the manifold 18 is closed off by the diaphragm of capsule 50, and the air flow from the manifold 18 to atmosphere at 49 is stopped.

Similarly, in all the FIG. 1 matrix resistance elements, air flow from the manifold 18 to atmosphere at 49 is shut off or allowed with a digital input of logic zero or one according to a specific arrangement for a particular application.

In the operation of the system of this invention, as in FIG. 1, with the oscillator 12 pulsing trigger gate TR, and with an analogue input signal that is rising, the pressure balance device 11 operates to close nozzle 19, and shut off the control signal to gate 31 from air supply 37. Thus, the up output 22 is activated. Consequently the resistances of the matrix 14 will be increasingly opened to air bleed to atmosphere according to the increasing count established in the counter 13. The pressure in the matrix manifold 18 thus drops until the pressure in bellows 27 of the pressure balance device drops to equal the pressure in the set bellows 28. When the input analogue signal is dropping, similar action occurs, through nozzle 20 and gate 32 to the down output 21, with consequent lessening of air bleed in the resistance matrix 14 until pressure in bellows 27 builds up to a value essentially equal to that in set bellows 28.

This invention, therefore, provides a new and useful pneumatic analogue to digital converter based on a digital matrix of bleed resistor elements in a differential pressure balanceable system.

As many embodiments may be made of the above invention, and as changes may be made in the embodiment set forth above without departing from the scope of the invention, it is to be understood that all matter hereinbefore set forth and in the accompanying drawings is to be interpreted as illustrative only and not in a limiting sense.

I claim:

1. A fluidic converter wherein an input analogue signal is converted into an output digital signal, said converter comprising an analogue input, a fluid input resistor in said input, a resistance matrix supply manifold, a fluid connection to said manifold from said analogue input from a point downstream of said input resistor, a pressure differential controller, a fluid connection to said controller from said analogue input from a point downstream of said resistor and in opposition to a reference input to said controller, a resistance matrix in digital progression, connected between said manifold and atmosphere, a fluid up-down counter, a fluid oscillator, means controlled by said controller for gating pulses from said oscillator to said counter, and means for applying digital output from said counter selectively to elements of said resistance matrix to selectively connect said manifold to atmosphere, and digital output means from said counter for a digital output signal representative of an analogue input signal in said analogue input.

2. A fluidic converter according to claim 1 wherein said controller comprises a pivoted tilt body, with said analogue input and said reference input in opposition to each other against said tilt body at one side of the pivot of said tilt body, and with a pair of sensor nozzles in opposition to each other against said tilt body at the other side of said pivot, said sensor nozzles being connected for back pressure control of said gating means input to said counter.

3. A fluidic converter according to claim 1 wherein said gating means includes a fluid supply trigger input to said fluid up-down counter, and a fluid trigger gate in said trigger input, said fluid oscillator having output means connected as a control to repeatedly operate said trigger gate, and fluid counter direction control means connected from each of said controller nozzles to said gating means.

4. A fluidic converter according to claim 3, with means for closing said trigger gate in the absence of up or down signal to said gating means from said controller.